United States Patent
Pribanic et al.

(10) Patent No.: US 10,286,345 B2
(45) Date of Patent: May 14, 2019

(54) BRUSHLESS DC MOTOR CONTROL AND METHODS OF OPERATING A FUEL PUMP

(71) Applicant: Clarcor Engine Mobile Solutions, LLC, Franklin, TN (US)

(72) Inventors: Justin R. Pribanic, Broad Brook, CT (US); David Chapman, East Hartford, CT (US)

(73) Assignee: Clarcor Engine Mobile Solutions, LLC, Franklin, TN (US)

( * ) Notice: Subject to any disclaimer, the term of this patent is extended or adjusted under 35 U.S.C. 154(b) by 269 days.

(21) Appl. No.: 15/187,623

(22) Filed: Jun. 20, 2016

(65) Prior Publication Data

US 2016/0369794 A1  Dec. 22, 2016

Related U.S. Application Data

(60) Provisional application No. 62/182,232, filed on Jun. 19, 2015.

(51) Int. Cl.
*B01D 36/00* (2006.01)
*H02K 11/00* (2016.01)
(Continued)

(52) U.S. Cl.
CPC ......... *B01D 36/005* (2013.01); *B01D 35/143* (2013.01); *B01D 37/04* (2013.01);
(Continued)

(58) Field of Classification Search
None
See application file for complete search history.

(56) References Cited

U.S. PATENT DOCUMENTS

| 4,580,951 A | 4/1986 | Carleton et al. |
| 4,726,746 A | 2/1988 | Takada et al. |

(Continued)

FOREIGN PATENT DOCUMENTS

| EP | 2336541 B1 | 11/2017 |
| JP | 07259676 | 10/1995 |

(Continued)

OTHER PUBLICATIONS

International Search Report and Written Opinion dated Oct. 5, 2016 (PCT/US2016/038425).

(Continued)

*Primary Examiner* — Richard C Gurtowski
(74) *Attorney, Agent, or Firm* — Alix, Yale & Ristas, LLP

(57) ABSTRACT

A fuel filter assembly incorporates a BLDC motor and control circuit configured to operate at a first rotational speed upon startup and switch to a second rotational speed when measured variables indicate that the filter assembly is filled with fuel. The first rotational speed is initiated as a default when power is applied to the control circuit. If the filter assembly has been serviced, it must be primed before resuming normal operation. The first rotational speed is significantly higher than the second rotational speed to reduce the amount of time necessary to prime the filter assembly. The control circuit is arranged to monitor a variable which corresponds to the torque necessary to drive the pump. When the pump is filled with air prior to priming, lower torque is required to drive the pump, which corresponds to lower current draw and power consumption at the BLDC motor.

8 Claims, 5 Drawing Sheets

(51) Int. Cl.

| | | |
|---|---|---|
| *H02K 11/33* | (2016.01) | |
| *F02M 37/22* | (2019.01) | |
| *B01D 37/04* | (2006.01) | |
| *F02M 59/12* | (2006.01) | |
| *F02M 59/44* | (2006.01) | |
| *F04C 2/10* | (2006.01) | |
| *F04C 14/08* | (2006.01) | |
| *F04C 15/00* | (2006.01) | |
| *F04C 2/344* | (2006.01) | |
| *H02K 9/22* | (2006.01) | |
| *H02K 7/14* | (2006.01) | |
| *B01D 35/143* | (2006.01) | |
| *F02M 37/08* | (2006.01) | |
| *F02D 41/30* | (2006.01) | |
| *F04C 29/00* | (2006.01) | |
| *F02D 41/00* | (2006.01) | |

(52) U.S. Cl.
CPC ......... *F02D 41/3082* (2013.01); *F02M 37/08* (2013.01); *F02M 37/22* (2013.01); *F02M 37/221* (2013.01); *F02M 59/12* (2013.01); *F02M 59/44* (2013.01); *F04C 2/102* (2013.01); *F04C 2/3447* (2013.01); *F04C 14/08* (2013.01); *F04C 15/008* (2013.01); *F04C 15/0061* (2013.01); *F04C 15/0096* (2013.01); *H02K 7/14* (2013.01); *H02K 9/22* (2013.01); *H02K 11/0094* (2013.01); *H02K 11/33* (2016.01); *F02D 41/0025* (2013.01); *F02M 2037/082* (2013.01); *F02M 2037/225* (2013.01); *F04C 29/0092* (2013.01)

(56) References Cited

U.S. PATENT DOCUMENTS

| | | | |
|---|---|---|---|
| 4,830,576 A | 5/1989 | Patrick | |
| 4,955,790 A | 9/1990 | Nakanishi et al. | |
| 4,978,282 A | 12/1990 | Fu et al. | |
| 4,998,865 A | 3/1991 | Nakanishi et al. | |
| 5,053,664 A | 10/1991 | Kikuta et al. | |
| 5,120,201 A | 6/1992 | Tuckey et al. | |
| 5,145,329 A | 9/1992 | Zumbusch et al. | |
| 5,356,272 A | 10/1994 | Nagata et al. | |
| 5,454,697 A | 10/1995 | Nakanishi | |
| 5,534,161 A | 7/1996 | Tarr et al. | |
| 5,613,844 A | 3/1997 | Tuckey et al. | |
| 5,842,454 A | 12/1998 | Miwa et al. | |
| 5,899,193 A | 5/1999 | Betz, II et al. | |
| 6,068,454 A | 5/2000 | Gaston et al. | |
| 6,514,404 B1 | 2/2003 | Bauer | |
| 6,652,249 B2 | 11/2003 | Kenney et al. | |
| 6,701,900 B1 | 3/2004 | Millar et al. | |
| 6,769,889 B1 | 8/2004 | Raney et al. | |
| 6,881,328 B2 | 4/2005 | Dittmann et al. | |
| 7,179,066 B2 | 2/2007 | Good et al. | |
| 7,418,951 B2 | 9/2008 | Hazama | |
| 7,576,503 B2 | 8/2009 | Nakanishi et al. | |
| 8,049,376 B2 | 11/2011 | Dokas et al. | |
| 8,157,542 B2 | 4/2012 | Boutros | |
| 8,188,624 B2 | 5/2012 | Noh et al. | |
| 8,242,725 B2 | 8/2012 | Thompson et al. | |
| 8,388,322 B2 | 3/2013 | Scharfenberg | |
| 8,415,855 B2 | 4/2013 | Li et al. | |
| 8,622,722 B2 | 1/2014 | Li et al. | |
| 8,901,797 B2 | 12/2014 | Castle et al. | |
| 9,169,833 B2 | 10/2015 | McCormick et al. | |
| 2004/0184942 A1 | 9/2004 | Phillips | |
| 2006/0153706 A1 | 7/2006 | Barth | |
| 2007/0295311 A1 | 12/2007 | McCue et al. | |
| 2008/0253899 A1 | 10/2008 | Nakanishi | |
| 2008/0310976 A1* | 12/2008 | Boutros | ................ F02M 37/08 417/410.1 |
| 2010/0116253 A1 | 5/2010 | Furuhashi et al. | |
| 2011/0052428 A1 | 3/2011 | Tarancioglu | |
| 2011/0200477 A1 | 8/2011 | Chua | |
| 2011/0266205 A1 | 11/2011 | Reyinger et al. | |
| 2012/0020810 A1 | 1/2012 | Stiles, Jr. et al. | |
| 2012/0073545 A1 | 3/2012 | Worthington et al. | |
| 2012/0245819 A1 | 9/2012 | Graf | |
| 2013/0002080 A1 | 1/2013 | Achor | |
| 2013/0153487 A1 | 6/2013 | Terry et al. | |
| 2013/0230418 A1 | 9/2013 | Okazono | |
| 2013/0320788 A1 | 12/2013 | Sakai et al. | |
| 2013/0330206 A1 | 12/2013 | Walters | |
| 2014/0353262 A1 | 12/2014 | Troxler | |
| 2015/0204327 A1 | 7/2015 | Pribanic | |
| 2017/0363034 A1* | 12/2017 | Graf | ..................... F04B 49/065 |

FOREIGN PATENT DOCUMENTS

| | | |
|---|---|---|
| KR | 20140146697 A | 12/2014 |
| WO | 9301874 A1 | 2/1993 |
| WO | 2010118486 A1 | 10/2010 |

OTHER PUBLICATIONS

Brown, Ward "Brushless DC Motor Control Made Easy," Microchip Technology, Inc., 2002, retrieved from http://ww1.microchip.com/downloads/en/AppNotes/00857a.pdf.

Supplementary European Search Report dated Nov. 21, 2018 for European Patent Application No. 16812639.9.

\* cited by examiner

BRUSHLESS DC MOTOR CONTROL AND METHODS OF OPERATING A FUEL PUMP

BACKGROUND

The disclosure relates to fuel filter assemblies and in particular to fuel filter assemblies that include a motor driven pump to move fuel through the filter assembly.

Fuel filter assemblies are configured to condition fuel prior to delivery to systems that consume the fuel, such as internal combustion engines. Fuel filter assemblies define a housing that routes fuel through one or more filter media configured to remove particulates and separate water from the fuel. The filter assembly may include a motor-driven pump that moves fuel through the assembly. The motor for driving the pump may be a brushed or brushless motor. Brushless motors are referred to as BLDC motors and require a drive circuit to generate the rotating magnetic field that drives the motor. Power consumed by a BLDC motor will be proportional to the torque needed to rotate the pump to which the motor is connected.

The filter media in a filter assembly must be periodically replaced to maintain the removal of particulates and water. Filter media may be contained within a disposable housing, which may be referred to as a filter cartridge, or may be supported on a filter element that is placed into a re-usable housing that may be opened for this purpose. When the filter media is replaced, and the filter assembly housing is closed, a large volume of air remains in the housing and must be displaced by fuel prior to resuming normal system operation. The process of displacing fuel with air is called "priming" the filter assembly. Various manual pumps have been proposed for this purpose. It has also been proposed to provide a separate pump which rotates in a first direction to empty the filter housing and operates in a reverse direction to prime the filter housing after a service event. These prior art approaches complicate the filter assembly by requiring additional components, connections and hardware.

There is a need in the art for a self-priming fuel filter assembly that does not require additional components.

SUMMARY OF THE INVENTION

The disclosed fuel filter assembly incorporates a BLDC motor and control circuit configured to operate at a first rotational speed upon startup and switch to a second rotational speed when measured variables indicate that the filter assembly is filled with fuel. The first rotational speed is initiated as a default when power is applied to the control circuit. If the filter assembly has been serviced, it must be primed before resuming normal operation. The first rotational speed is significantly higher than the second rotational speed to reduce the amount of time necessary to prime the filter assembly. The control circuit is arranged to monitor a variable which corresponds to the torque necessary to drive the pump. When the pump is filled with air prior to priming, lower torque is required to drive the pump, which corresponds to lower current draw and power consumption at the BLDC motor. Variables such as current draw and power consumption can be monitored at the control circuit and a threshold value can be used to switch from the initial priming speed to the second, lower, operational speed. Variables such as fluid pressure at the filter assembly outlet may also be employed for this purpose. In a simplified alternative, the priming speed may be set to a pre-determined time, with excess fuel bled off by a mechanical regulator when the filter assembly is full of fuel.

When the threshold variable value is reached, the control circuit switches from the high initial priming rotational speed to the lower steady state operational speed. According to aspects of the disclosure, the control circuit may be configured to maintain the steady state rotational speed even if the measured variable falls below the threshold variable value.

In one embodiment, a motor control circuit is programmed to operate a fuel filter pump at a first, priming rotational speed at power up that is higher than a steady state operational speed.

In one embodiment, a motor control circuit is programmed to operate a fuel filter pump at a default rotational speed that is higher than a steady state rotational speed of the pump.

In one embodiment, a motor control circuit is programmed to switch driving a fuel filter pump at a first, priming rotational speed to a second, steady state rotational speed when current consumed by a motor driving the pump exceeds a pre-determined threshold.

In one embodiment, a motor control circuit is programmed to switch driving a fuel filter pump at a first, priming rotational speed to a second, steady state rotational speed when power consumed by a motor driving the pump exceeds a pre-determined threshold.

Alternative embodiments of the disclosed brushless DC motor control may incorporate one or more of the features set forth in the detailed description below.

DETAILED DESCRIPTION

Figure 1:
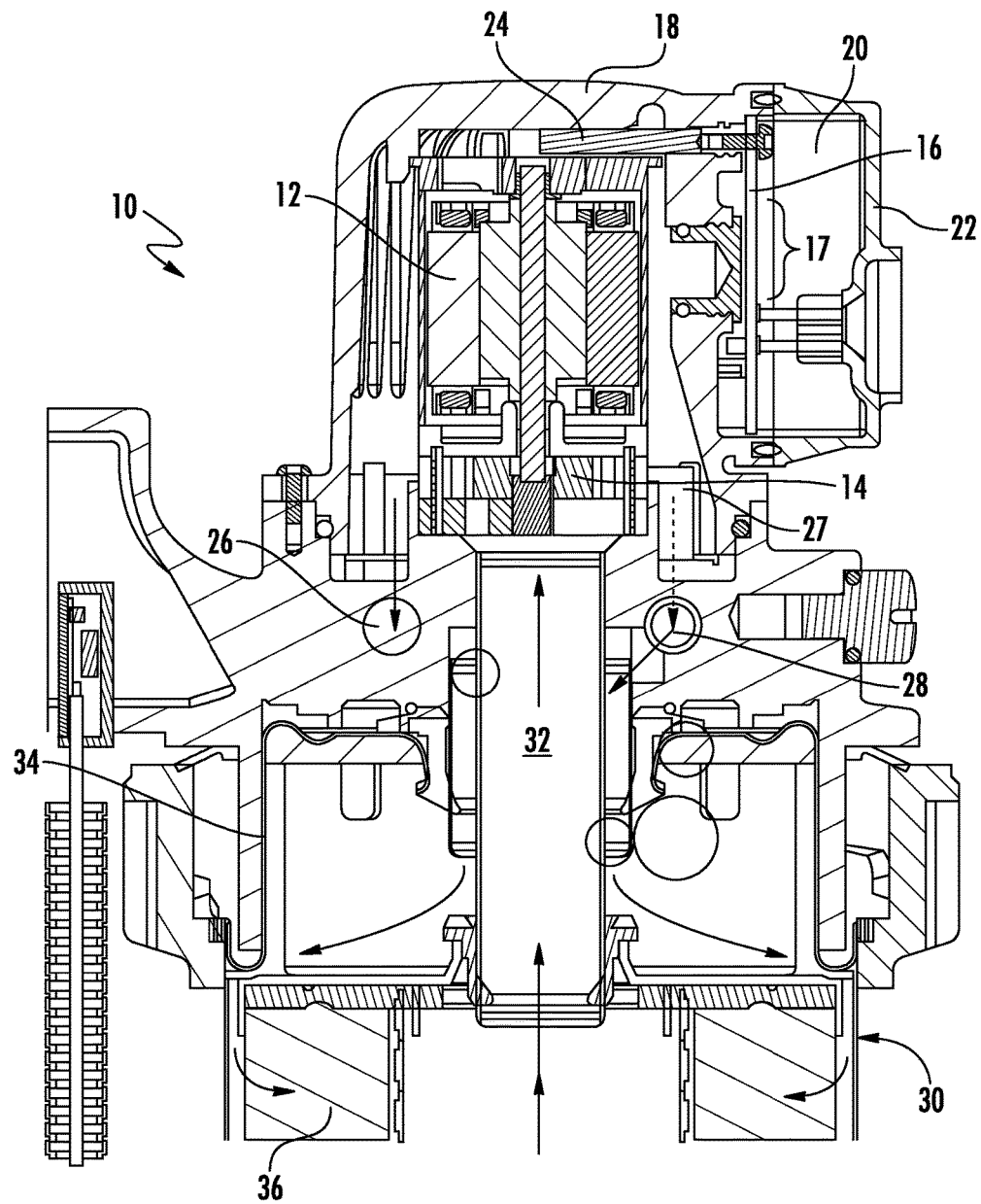
FIG. 1 is a sectional view through a filter assembly according to aspects of the disclosure.

FIG. 1 is a sectional view through a filter assembly 10 incorporating a brushless DC motor (BLDC motor) 12 and integrated pump 14 according to aspects of the disclosure. A control board 16 is arranged on the side of the pump housing 18 in a compartment 20 defined partially by the housing 18 and partially by a cover 22 secured to the housing. Together, the housing 18 and cover 22 provide a sealed enclosure for the control board 16 and electronic control circuit 17 that drive the BLDC motor 12. The control circuit for a BLDC motor is generally known to those skilled in the art and typically includes a programmable microcontroller and components necessary to generate the rotating magnetic field that drives the BLDC motor 12. Power delivered to the BLDC motor may be controlled using pulse width modulation (PWM) to vary the duty cycle of the power transmitted to the motor 12. Power is transmitted from the control board 16 to the BLDC motor 12 through conductive studs 24 (one of three is shown) that pass through the wall of the housing 18. The BLDC motor 12 and pump 14 are arranged at the clean fuel outlet 26 of the filter assembly 10 and pull fuel through fuel delivery conduits from a fuel reservoir (not shown), through the filter cartridge 30 and deliver the fuel to downstream engine assemblies such as high pressure fuel pumps and fuel injection systems (not shown) via outlet 26.

In the disclosed embodiment, the pump 14 coupled to the BLDC motor 12 is a gerotor pump that will pump air or liquid. Other pump configurations may be compatible with the disclosed filter assemblies and methods. The pump 14 is connected in fluid communication with an outlet 32 of the housing 34 surrounding a filter element 36, placing the filter housing and filter element on the suction side of the pump 14. Alternatively, the pump 14 may be connected to push fluid through the filter housing and filter media. A gerotor pump is an example of a "positive displacement" pump, in which the volume of fluid pumped is the same for each rotation of the pump, regardless of pressure.

The disclosed filter assembly 10 is of the type where the replaceable filter component carries its own housing 34 and is typically referred to as a filter cartridge 30. Alternative filter assembly configurations employ a permanent housing that can be opened to remove and replace a filter element. In either form of filter assembly, replacement of a spent filter cartridge or filter element results in a large pocket of air in the filter assembly. The air must be displaced by fuel to re-fill the filter assembly 10 before the fuel delivery system can be returned to service. The process of filling a filter assembly with fuel after a service event or loss of fuel in the assembly is called "priming" the assembly.

In the disclosed filter assembly 10, the control board 16 includes control circuitry 17 configured to operate the BLDC motor 12 to drive the pump 14 to maintain a constant flow of pressurized fuel to downstream engine assemblies (not shown). The control circuitry 17 includes a microcontroller that runs firmware implementing the disclosed methods of operating a filter assembly. The filter assembly 10 includes a mechanical regulator 27 to regulate pressure of fuel leaving the filter assembly, which simplifies the filter assembly and motor control software. In one disclosed embodiment, the motor control circuit 17 is set to drive the BLDC motor 12 at a fixed rotational speed, where the BLDC motor 12 and pump 14 are configured to provide enough fuel to meet maximum demand from the engine to which the filter assembly 10 is connected. In the disclosed embodiment, during periods of non-peak demand for fuel, excess fuel is bled off by the mechanical regulator 27 and returned to the inlet 28 of the filter assembly 10 where it is recirculated through the filter media 36 to the outlet 32 of the filter housing 34. In the disclosed filter assembly 10, the fixed rotational speed of the motor during normal operation is approximately 3600 rpm, with the motor consuming between 50 and 60 watts of power. In the disclosed filter assembly 10, the BLDC motor 12 draws approximately 8 amps of current during steady state operation and generates outlet pressure of approximately 5 bar (72 psi).

Figure 5:
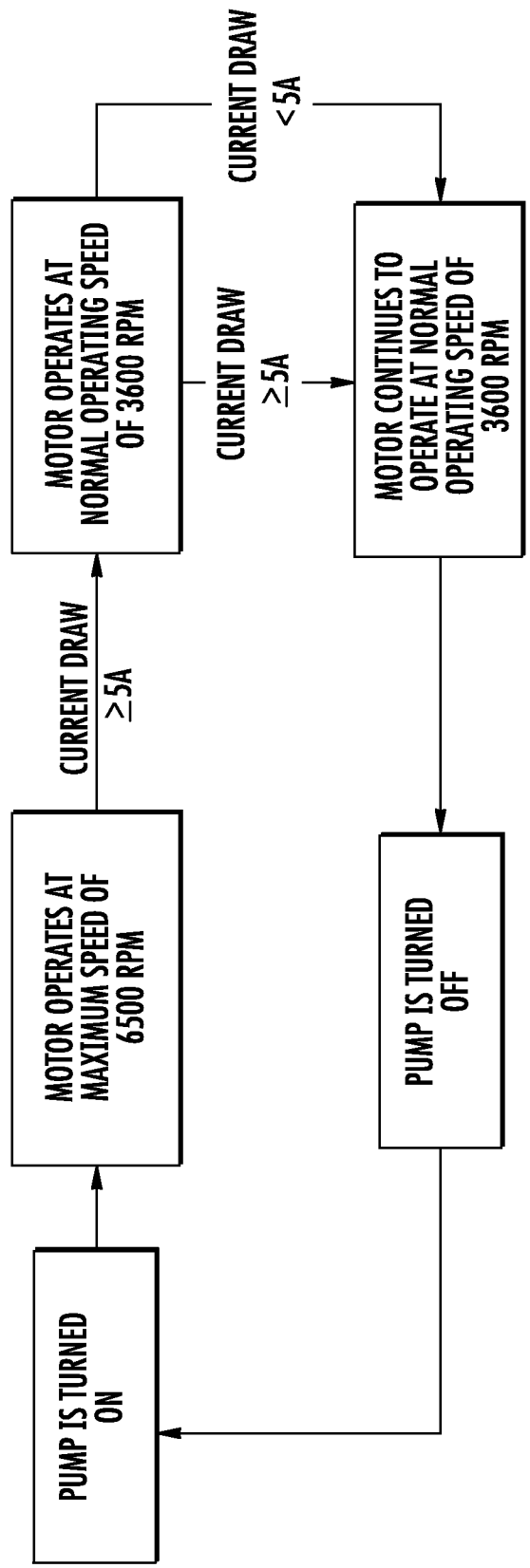
FIG. 5 is a simplified operational block diagram illustrating aspects of the disclosed method.

As shown in the block diagram of FIG. 5, when the fuel filter assembly 10 is powered up after a service event, most of the filter assembly is filled with air, and in this condition the drag on the pump 14 coupled to the BLDC motor 12 is low compared to when the pump 14 is filled with fuel. The air needs to be displaced with fuel for the connected engine to resume operation. In the disclosed embodiment, the control circuit is programmed to drive the BLDC motor at 6500 rpm while the filter assembly is being primed with fuel. Running the BLDC motor and pump at a higher rotational speed reduces the time needed to prime the filter assembly with fuel. The BLDC motor consumes between 19 and 21 watts of power to drive the BLDC motor at 6500 rpm when pumping air out of the filter assembly. The BLDC motor draws approximately 2 amps when pumping air at 6500 rpm during priming.

Figure 2:
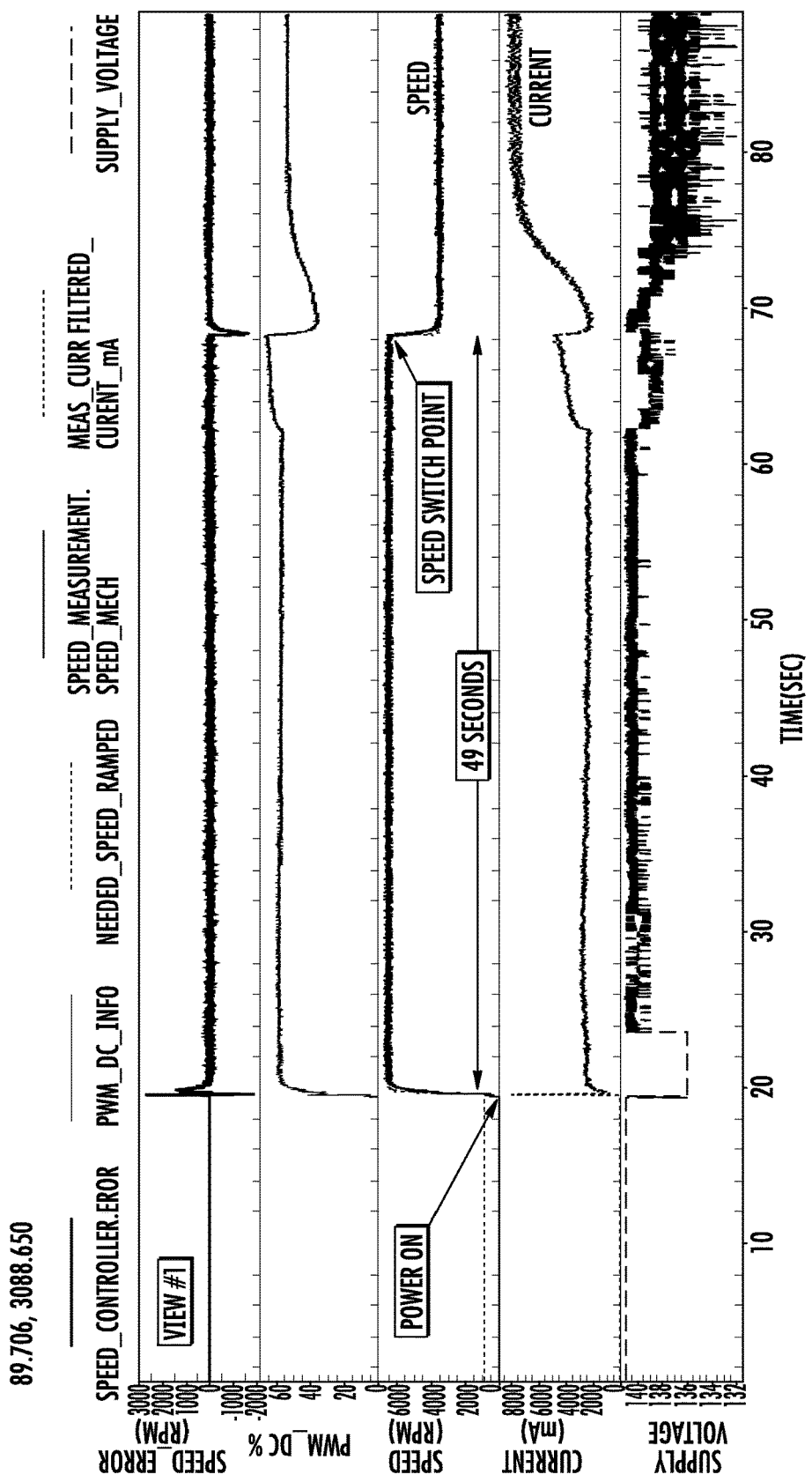
FIG. 2 illustrates variables relevant to the disclosed filter assembly and methods during system startup after a service event with the filter housing and assembly drained of fuel.

FIG. 2 illustrates measurements taken from the disclosed embodiment of a filter assembly while priming the filter assembly. The test was started with a new dry filter cartridge and the system plumbing had been drained of fuel. From power on it took 49 seconds to fill the filter assembly with fuel, which included lifting the fuel the equivalent of 8 vertical feet. As the filter assembly 10 fills with fuel, the pressure at the outlet 26 accumulates and the BLDC motor 12 begins to draw more current. Testing has proven that when the priming is essentially complete, the current drawn by the BLDC motor 12 exceeds 5 amps. The disclosed control circuit 17 is programmed to monitor the current draw of the BLDC motor 10 and when the current exceeds 5 amps, then the control circuit 17 reduces the motor rotational speed to 3600 rpm, which is maintained during operation of the engine to which the disclosed filter assembly is connected.

Figure 3:
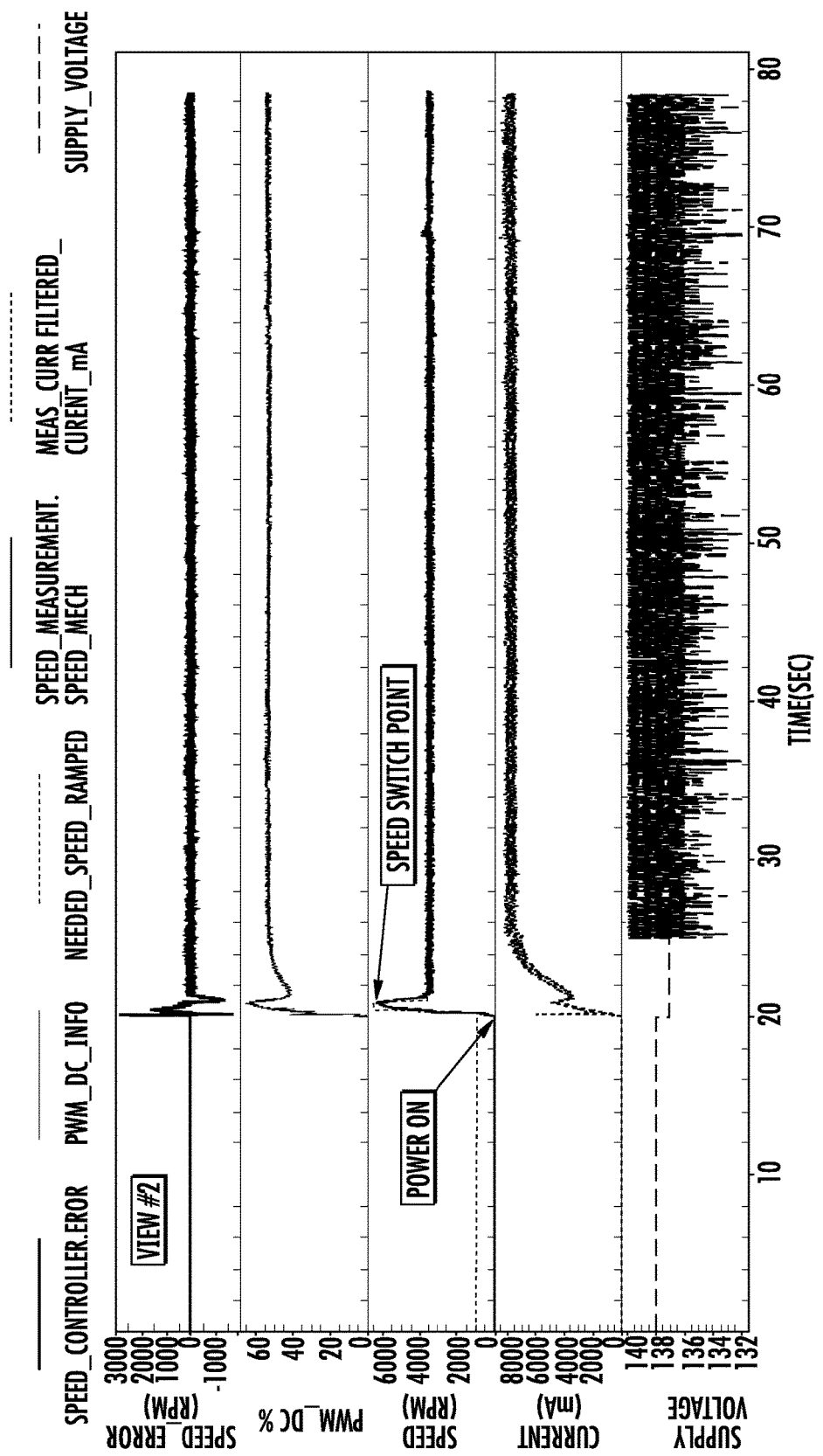
FIG. 3 illustrates variables relevant to the disclosed filter assembly and methods during system startup when the filter housing and assembly are full of fuel.

FIG. 3 illustrates a start sequence where the filter assembly 10 already filled with fuel, as in a normal start up in the absence of a service event. It took less than 2 seconds for the system pressure to rise and the BLDC motor 12 to begin consuming more than 5 amps, triggering the switch to the 3600 rpm operating speed. FIG. 3 illustrates the disclosed filter assembly operation during a normal start of the equipment.

Figure 4:
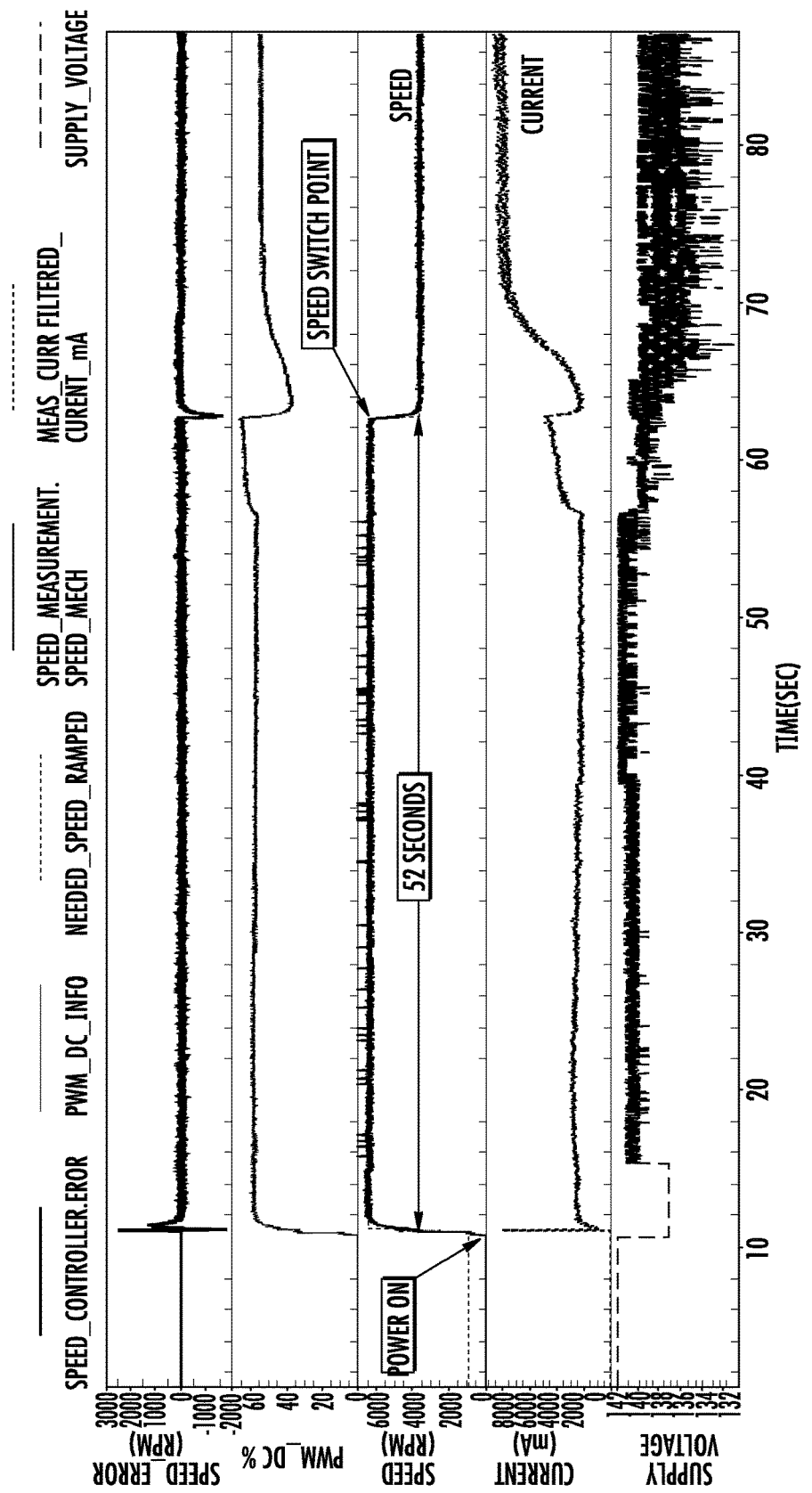
FIG. 4 illustrates variables relevant to the disclosed filter assembly and methods during system startup after a service event with the filter housing and assembly drained of fuel.

FIG. 4 illustrates a startup sequence with the filter assembly configured to raise fuel the equivalent of 10 vertical feet, starting with a new dry filter cartridge and the filter assembly drained of fuel. It took the disclosed filter assembly 52 seconds to complete priming and cause the BLDC motor 12 to exceed 5 amps of current draw, triggering the switch to the lower 3600 rpm operating speed. The maximum inlet vacuum observed during this test was 0.26 bar (3.7 psi) (7.6 in-Hg).

After the disclosed filter assembly 10 has been powered off and then turned back on, the control circuit 17 will automatically default to a motor speed of 6500 rpm. 6500 rpm exceeds the normal operating speed of the pump by more than 40%, and may approach the maximum operating rotational speed of the hardware. The high initial rotational speed of the BLDC motor 12 is selected to maximize the priming capabilities of the disclosed filter assembly. Once the current drawn by the BLDC motor 12 reaches 5 A, the control circuit 17 switches to the normal operating speed of 3600 rpm, and as long as power is maintained to the filter assembly, the motor speed will be maintained at 3600 rpm even if current drawn by the BLDC motor 12 drops below the 5 A threshold. When power has been turned off, the control circuit 17 will default to the 6500 rpm speed, but will almost immediately drop to 3600 rpm if fuel is already present in the system, as shown in FIG. 2.

Monitoring current drawn by the BLDC motor serves as a proxy for monitoring power consumed by the BLDC motor. An alternative control method may monitor power consumed by the BLDC motor and switch from the first, (higher) rotational speed to the second (lower) operational speed upon detection of power consumed by the BLDC motor 12 that exceeds a power threshold indicating that the fuel filter assembly 10 has completed priming and is filled with fuel. In the disclosed embodiment, when power consumed by the BLDC motor 12 exceeds approximately 40 watts, the filter assembly 10 is filled with fuel and the BLDC motor 12 can then be driven at the second rotational speed, which corresponds to steady state operation of the filter assembly.

In a further alternative control method, a pressure sensor (not shown) may be arranged at the outlet 26 of the filter assembly 10 and used to monitor when the assembly has completed priming. Other control inputs may be employed to trigger the shift from a high priming rotational speed to a lower steady state rotational speed. It is also possible to program the control circuit to start up at a high priming speed for a pre-determined time interval, with excess fuel returned to the filter assembly inlet when the filter assembly is filled with fuel.

What is claimed:

1. A fuel filter assembly comprising:
   a filter housing surrounding a filter element and configured to direct fuel through filter media supported by the filter element said filter housing defining an inlet for fuel to be filtered and an outlet through which filtered fuel is delivered;
   a BLDC motor connected to a pump arranged to pump fuel from the inlet, through the filter housing and filter media to the outlet;
   a control circuit connected to drive the BLDC motor at a plurality of rotational speeds, said control circuit configured to drive the BLDC motor at a first pre-determined rotational speed at startup and switch to a second pre-determined rotational speed when current drawn by the BLDC motor exceeds a threshold current,
   wherein said first pre-determined rotational speed is greater than said second pre-determined rotational speed.

2. The fuel filter assembly of claim 1, wherein said control circuit continues to drive the BLDC motor at the second rotational speed even if current drawn by the BLDC motor falls below the threshold current.

3. The fuel filter assembly of claim 1, wherein said first rotational speed is at least 30% greater than said second rotational speed.

4. The fuel filter assembly of claim 1, wherein said first rotational speed is at least 40% greater than said second rotational speed.

5. The fuel filter assembly of claim 1, wherein current drawn by said BLDC motor at startup below the threshold current corresponds to a filter housing filled with air and a current drawn by said BLDC motor above said threshold current corresponds to a filter housing filled with fuel.

6. The fuel filter assembly of claim 1, wherein said pump is connected to said outlet and draws fuel through said housing and filter media.

7. A method of operating a fuel filter assembly comprising:
   a fuel pump driven by a BLDC motor and arranged to pump fuel through filter media supported in a housing having an inlet and an outlet; and
   a control circuit connected to drive the BLDC motor at a plurality of rotational speeds, said method comprising the steps of:
   when the fuel filter assembly is powered up, driving the BLDC motor at a first rotational speed,
   monitoring power consumed by the BLDC motor, and
   when power consumed by the BLDC motor exceeds a threshold power, driving the BLDC motor at a second rotational speed at least 20% lower than said first rotational speed and maintaining said second rotational speed even if power consumed by said BLDC motor falls below said threshold power.

8. The method of operating a fuel filter assembly of claim 7, wherein said second rotational speed is at least 40% lower than said first rotational speed.

* * * * *